United States Patent
Tanno

(10) Patent No.: US 8,905,099 B2
(45) Date of Patent: Dec. 9, 2014

(54) LOW NOISE PNEUMATIC TIRE

(71) Applicant: The Yokohama Rubber Co., Ltd., Tokyo (JP)

(72) Inventor: Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/036,824

(22) Filed: Sep. 25, 2013

(65) Prior Publication Data

US 2014/0020801 A1    Jan. 23, 2014

Related U.S. Application Data

(62) Division of application No. 11/886,708, filed as application No. PCT/JP2006/308599 on Apr. 25, 2006, now Pat. No. 8,567,464.

(30) Foreign Application Priority Data

Apr. 25, 2005  (JP) .................. 2005-126359

(51) Int. Cl.
*B60C 19/00* (2006.01)
*B60C 5/00* (2006.01)
*B60C 17/10* (2006.01)

(52) U.S. Cl.
CPC ............. *B60C 19/002* (2013.01); *B60C 17/106* (2013.01)
USPC .......................................... 152/450; 152/521

(58) Field of Classification Search
CPC ..................................................... B60C 19/002
USPC .................................................. 152/450, 521
See application file for complete search history.

(56) References Cited

U.S. PATENT DOCUMENTS

| | | |
|---|---|---|
| 2,040,645 A | 5/1936 | Dickinson |
| 4,031,940 A | 6/1977 | Bartley et al. |
| 4,096,898 A | 6/1978 | Messerly et al. |
| 4,216,812 A | 8/1980 | Bourne |
| 4,287,930 A | 9/1981 | McIntosh et al. |

(Continued)

FOREIGN PATENT DOCUMENTS

| | | |
|---|---|---|
| DE | 19806935 | 9/1999 |
| GB | 1 359 468 | 7/1974 |

(Continued)

OTHER PUBLICATIONS

U.S. Appl. No. 12/433,975, filed May 1, 2009.

(Continued)

*Primary Examiner* — Adrienne C Johnstone
(74) *Attorney, Agent, or Firm* — Greer Burns & Crain Ltd.

(57) ABSTRACT

Provided is a low noise pneumatic tire in which the noise absorbing member on the inner peripheral surface of the tire is made less likely to be damaged when the pneumatic tire is removed from the rim. The pneumatic tire includes a noise absorbing member of a porous material which is attached to an inner peripheral surface of the tire. In the pneumatic tire, a lubricant is applied to the inner peripheral surface of the noise absorbing member. Alternatively, both end portions, in a tire width direction, of the inner peripheral surface of the noise absorbing member are covered with protective layers harder than the noise absorbing member.

14 Claims, 3 Drawing Sheets

(56) References Cited

U.S. PATENT DOCUMENTS

| | | |
|---|---|---|
| 4,340,104 A | 7/1982 | Kuan |
| 4,681,147 A | 7/1987 | Hugele |
| 5,658,987 A | 8/1997 | Nakamura et al. |
| 6,217,683 B1 | 4/2001 | Balzer et al. |
| 6,538,066 B2 | 3/2003 | Watanabe et al. |
| 6,726,289 B2 | 4/2004 | Yukawa et al. |
| 7,455,092 B2 | 11/2008 | Yukawa et al. |
| 7,490,644 B2 | 2/2009 | Yukawa |
| 7,677,286 B2 | 3/2010 | Tanno |
| 2003/0111156 A1 | 6/2003 | McNichols et al. |
| 2005/0046978 A1 | 3/2005 | Schofield et al. |
| 2005/0205183 A1 | 9/2005 | Yukawa |
| 2005/0247391 A1 | 11/2005 | Ikuta |
| 2005/0275277 A1 | 12/2005 | Yukawa |
| 2006/0108042 A1 | 5/2006 | Yukawa et al. |
| 2007/0199636 A1* | 8/2007 | Tanno ................. 152/450 X |
| 2009/0199942 A1 | 8/2009 | Tanno |
| 2009/0242094 A1 | 10/2009 | Kato et al. |
| 2009/0314402 A1 | 12/2009 | Kuramori et al. |
| 2009/0314403 A1 | 12/2009 | Tanno |
| 2009/0320980 A1 | 12/2009 | Tanno |
| 2010/0032073 A1 | 2/2010 | Tanno et al. |

FOREIGN PATENT DOCUMENTS

| | | |
|---|---|---|
| JP | 62-216803 | 9/1987 |
| JP | 1-078902 | 3/1989 |
| JP | 64-078902 | 3/1989 |
| JP | 4-159101 | 6/1992 |
| JP | 06-106903 | 4/1994 |
| JP | 8-217923 | 8/1996 |
| JP | 9-086112 | 3/1997 |
| JP | 2001-113902 | 4/2001 |
| JP | 2003-063208 | 3/2003 |
| JP | 2003-226104 | 8/2003 |
| JP | 2004-042822 | 2/2004 |
| JP | 2004-291855 | 10/2004 |
| JP | 2005-205935 | 8/2005 |
| JP | 2005-238888 | 9/2005 |
| JP | 2005-262921 | 9/2005 |
| JP | 2005-297836 | 10/2005 |
| JP | 2006-044503 | 2/2006 |
| JP | 2006-306285 | 11/2006 |
| WO | WO 03/103989 | 12/2003 |
| WO | WO 2005/012008 | 2/2005 |
| WO | WO 2006-118200 | 11/2006 |
| WO | WO 2006-118202 | 11/2006 |
| WO | WO 2006118198 | 11/2006 |
| WO | WO 2007141973 | 12/2007 |

OTHER PUBLICATIONS

U.S. Appl. No. 11/919,113, filed Jan. 15, 2009.
U.S. Appl. No. 12/422,548, filed Apr. 13, 2009.
U.S. Appl. No. 11/919,183, filed Sep. 8, 2009.
U.S. Appl. No. 11/919,184, filed Oct. 12, 2009.
U.S. Appl. No. 13/711,171, filed Dec. 11, 2012.
U.S. Appl. No. 13/711,121, filed Dec. 11, 2012.
U.S. Appl. No. 12/919,313, filed Aug. 25, 2010.
U.S. Appl. No. 11/886,708, filed Sep. 19, 2007.
U.S. Appl. No. 13/895,884, filed May 16, 2013.
U.S. Appl. No. 13/895,820, filed May 16, 2013.
Office Action issued in U.S. Appl. No. 12/422,548 dated May 6, 2011.
Office Action issued in U.S. Appl. No. 12/422,548 dated Oct. 13, 2011.
Office Action issued in U.S. Appl. No. 12/422,548 dated Mar. 9, 2012.
Office Action issued in U.S. Appl. No. 12/422,548 dated Nov. 21, 2012.
Office Action issued in U.S. Appl. No. 12/422,548 dated Mar. 28, 2013.
Office Action issued in U.S. Appl. No. 12/422,548 dated Aug. 28, 2013.
Office Action issued in U.S. Appl. No. 12/422,548 dated Jun. 26, 2014.
Office Action issued in U.S. Appl. No. 11/919,113 dated Jul. 26, 2011.
Office Action issued in U.S. Appl. No. 11/919,113 dated Sep. 26, 2011.
Office Action issued in U.S. Appl. No. 11/919,113 dated Mar. 6, 2012.
Office Action issued in U.S. Appl. No. 11/919,113 dated Jun. 12, 2012.
Office Action issued in U.S. Appl. No. 11/919,113 dated Feb. 5, 2013.
Office Action issued in U.S. Appl. No. 11/919,184 dated Oct. 27, 2011.
Office Action issued in U.S. Appl. No. 11/919,184 dated Jan. 6, 2012.
Office Action issued in U.S. Appl. No. 11/919,184 dated Sep. 4, 2012.
Office Action issued in U.S. Appl. No. 11/919,184 dated Dec. 12, 2012.
Office Action issued in U.S. Appl. No. 11/919,183 dated Oct. 27, 2011.
Office Action issued in U.S. Appl. No. 11/919,183 dated Jan 4, 2012.
Office Action issued in U.S. Appl. No. 11/886,708 dated Jun. 30, 2010.
Office Action issued in U.S. Appl. No. 11/886,708 dated Oct. 13, 2010.
Office Action issued in U.S. Appl. No. 11/886,708 dated Apr. 26, 2011.
Office Action issued in U.S. Appl. No. 11/886,708 dated Mar. 29, 2012.
Office Action issued in U.S. Appl. No. 11/886,708 dated Jan. 16, 2013.
Office Action issued in U.S. Appl. No. 13/711,121 dated Sep. 30, 2013.
Office Action issued in U.S. Appl. No. 13/711,171 dated Jun. 11, 2013.
Office Action issued in U.S. Appl. No. 13/711,171 dated Apr. 11, 2014.

* cited by examiner

LOW NOISE PNEUMATIC TIRE

TECHNICAL FIELD

The present invention relates to a low noise pneumatic tire, and specifically, to an improvement of a low noise pneumatic tire in which a noise absorbing member of a porous material is disposed on the inner peripheral surface of the tire.

BACKGROUND ART

There are various types of tire noises generated during the running of a pneumatic tire. As one of the tire noises, there is cavity resonance sound generated due to the vibration of the air filled in the tire. Heretofore, as a method for effectively reducing the cavity resonance sound, there has been proposed one as shown in FIG. 5, in which a noise absorbing member 5 of a porous material such as a polyurethane foam is disposed on the inner peripheral surface of the tire on the inner side of a tread portion 1, so that the cavity resonance sound is absorbed by the noise absorbing member 5 (for example, refer to Patent Documents 1 and 2).

When removing such a pneumatic tire T, in which the noise absorbing member 5 is attached, from a rim R for the purpose of tire rotation or the like, after the pneumatic tire T is mounted on the rim R, as shown in FIG. 6, a tip end of a lever X of a tire changer is sometimes pressed strongly against a surface of the noise absorbing member 5. However, since the porous material composing the noise absorbing member is generally soft and low in tear strength, there is a problem that the noise absorbing member is likely to be damaged when the lever of the tire changer is pressed against the surface of the noise absorbing member as described above. Specifically, a pneumatic tire of which the aspect ratio is smaller and the section height is lower has a tendency that the noise absorbing member is more likely to be damaged. Once damage occurs as described above on the noise absorbing member of the low noise tire, a stress that is based on deformation of the pneumatic tire during the running thereof is concentrated to the damaged spot. Accordingly, the noise absorbing member is gradually removed from the inner peripheral surface of the tire, which leads to a problem that desired noise absorbing performance cannot be obtained.

Patent Document 1: Japanese patent application Kokai publication No. Sho62-216803

Patent Document 2: Japanese patent application Kokai publication No. 2003-63208

DISCLOSURE OF THE INVENTION

An object of the present invention is to provide a low noise pneumatic tire in which the noise absorbing member on the inner peripheral surface is made less likely to be damaged when the pneumatic tire is removed from the rim.

A low noise pneumatic tire of the present invention, which achieves the above-described object, includes a noise absorbing member of a porous material attached to an inner peripheral surface of the tire, in which a lubricant is applied to at least both end portions in a tire width direction of an inner peripheral surface of the noise absorbing member.

Moreover, another low noise pneumatic tire of the present invention, which achieves the above-described object, includes a noise absorbing member of a porous material attached to an inner peripheral surface of the tire, in which both end portions in a tire width direction on an inner peripheral surface of the noise absorbing member are covered with protective layers harder than the noise absorbing member.

In accordance with the former low noise pneumatic tire, the lubricant is applied to at least both of the end portions in the tire width direction on the inner peripheral surface of the noise absorbing member. Accordingly, even if the lever of the tire changer is brought into contact with the surface of the noise absorbing member when the pneumatic tire mounted on the rim is removed form the rim, the tip end of the lever slips on the surface of the noise absorbing member, thus making it possible to prevent the damage of the noise absorbing member.

Moreover, in accordance with the latter low noise pneumatic tire, both of the end portions in the tire width direction on the inner peripheral surface of the noise absorbing member are covered with the protective layers harder than the noise absorbing member. Accordingly, when the pneumatic tire mounted on the rim is removed form the rim, strong pressing force from the lever of the tire changer is relieved by the above-described protective layers, thus making it possible to prevent the damage of the noise absorbing member. Hence, even if the pneumatic tire after being removed from the rim is reused, there is no concentration of a stress originated from such a damaged spot, and a breakage is less likely to occur. Accordingly, the noise absorbing performance of the noise absorbing member can be maintained for a long period of time.

BEST MODES FOR CARRYING OUT THE INVENTION

Figure 1:
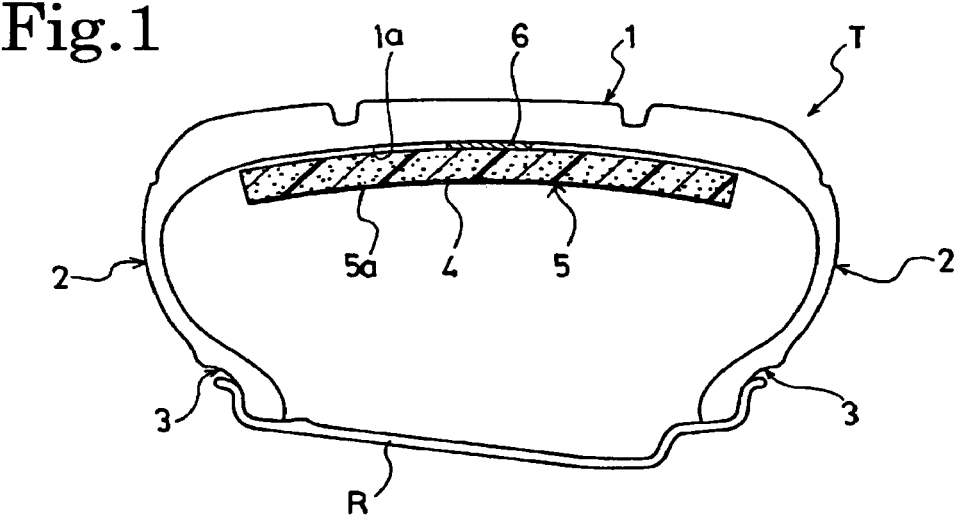
FIG. 1 is a meridian cross-sectional view showing a state where a low noise pneumatic tire according to an embodiment of the present invention is mounted on a rim.

A description will be made below of a low noise pneumatic tire of the present invention with reference to the embodiments shown in the drawings.

FIG. 1 is a meridian cross-sectional view showing a state where a low noise pneumatic tire is mounted on a rim according to an embodiment of the present invention.

Such a pneumatic tire T is composed of a pair of right and left side wall portions 3, 3 as well as a pair of right and left bead portions 2, 2 are formed respectively on the right and left sides of a tread portion 1. Though not shown, besides the above, a carcass layer that forms a frame of the tire, a belt layer that gives rigidity to the tread portion, and the like are provided in the tire body. Onto an inner peripheral surface 1a of the tire as described above, a noise absorbing member 5 is attached by an elastic fixing band 6. The noise absorbing member 5 is composed of a belt-like porous material, and is attached annularly so as to go along the inner peripheral surface 1a of the tire. Moreover, an inner peripheral surface 5a of the noise absorbing member 5 is entirely applied with a lubricant 4. As shown in FIG. 1, the inner peripheral surface 1a of the pneumatic tire T forms a cavity in combination with the rim R, and no lubricant is present on the inner peripheral surface of the tire.

Figure 6:
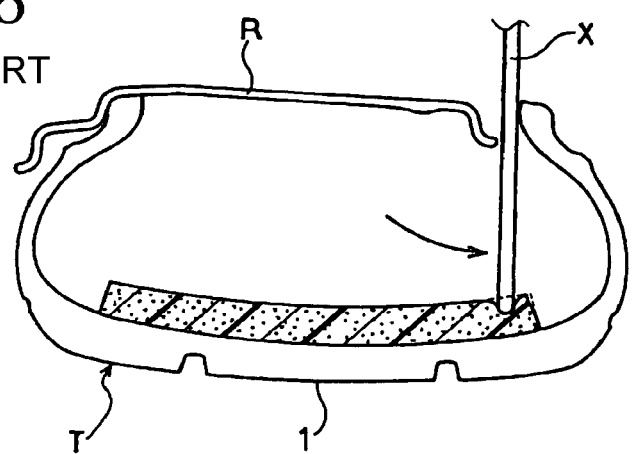
FIG. 6 is an explanatory view showing a cross-section of the low noise pneumatic tire of FIG. 5 when the low noise pneumatic tire is removed from the rim.

When the above-described pneumatic tire T in the state of being mounted on the rim R is removed from the rim R by using a tire changer, as shown in FIG. 6, a tip end of a lever X of the tire changer sometimes presses the surface of the noise absorbing member 5. However, in the above-described pneumatic tire T, the lubricant 4 is applied to the surface of the noise absorbing member 5, and accordingly, even if the lever X is pressed against the surface concerned, the tip end thereof slips on the surface, and thereby does not damage the noise absorbing member 5. Accordingly, even if the pneumatic tire concerned is reused after being removed from the rim, the noise absorbing member is not broken at an early stage, but can exert good noise absorbing performance for a long period of time.

An applied region of the noise absorbing member 5 with the lubricant 4 only needs to be at least both end portions in the tire width direction of the inner peripheral surface 5a. Preferably, the entire region of the inner peripheral surface 5a is applied with the lubricant 4. Besides such a case as described above where the lubricant 4 is applied to the inner peripheral surface 5a of the noise absorbing member 5, the lubricant 4 may be applied also to an outer peripheral surface side of the noise absorbing member 5. The lubricant is applied also to the outer peripheral surface of the noise absorbing member, whereby contact friction resistance between the noise absorbing member and the inner peripheral surface of the tire can be reduced. Accordingly, durability of the noise absorbing member can be enhanced.

Types of the lubricant are not particularly limited; however, for example, wax, graphite, molybdenum disulfide, boron, polytetrafluoroethylene, talc, silicone, liquid paraffin, mineral oil, and the like can be illustrated. Only one type of these lubricants may be used singly, or two or more types thereof may be used in combination. As the above-described wax, there can be used natural wax; Fischer-Tropsch wax; hydrocarbon synthesis wax of a polyethylene and the like; fatty acid ester wax; fatty acid amid; ketones/amines; hardened caster oil; and the like. Also with regard to these waxes, only one type thereof may be used singly, or two or more types thereof may be used in combination.

Figure 2:
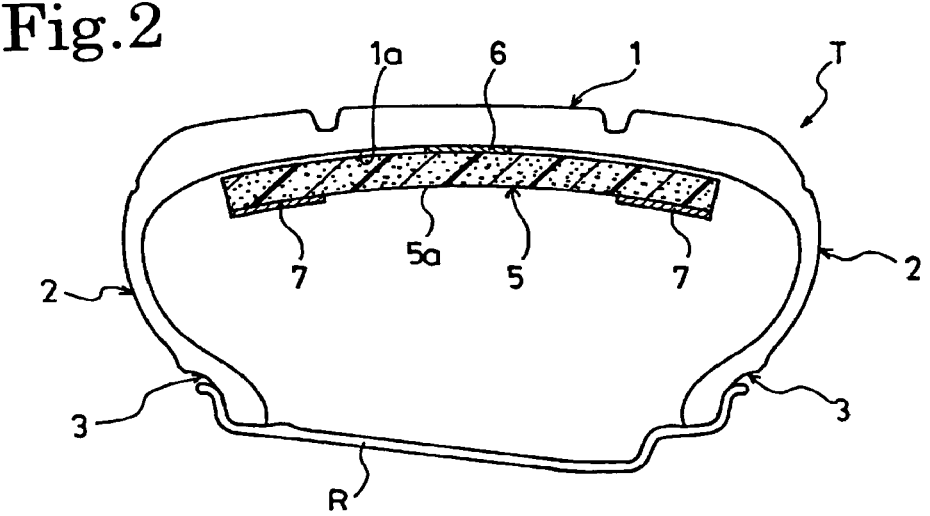
FIG. 2 is a meridian cross-sectional view showing a state where a low noise pneumatic tire according to another embodiment of the present invention is mounted on the rim.
Figure 3:
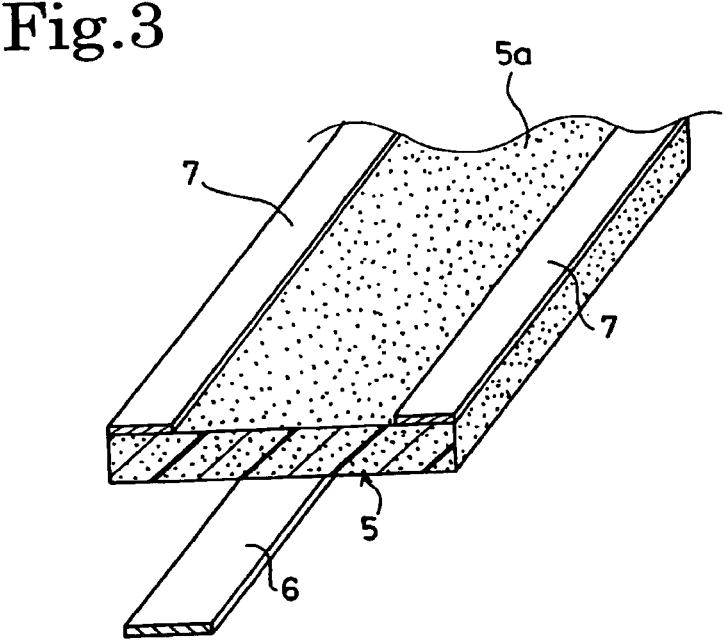
FIG. 3 is a perspective view showing a noise absorbing member attached to the pneumatic tire of FIG. 2, in a state of partially being cutaway.

FIG. 2 shows a state where a low noise pneumatic tire is mounted on the rim according to another embodiment of the present invention, and FIG. 3 shows a noise absorbing member attached to an inner surface of the above-described tire, together with an elastic fixing band to attach the noise absorbing member.

A tire body of such a pneumatic tire T of FIG. 2 is the same as that in the case of the embodiment of FIG. 1, and accordingly, a description of the tire body will be omitted. Referring also to FIG. 3 together with FIG. 1, a noise absorbing member 5 is composed of a belt-like porous material as in FIG. 1, and such a belt-like member is attached annularly so as to go along a inner peripheral surface 1a of the tire in an inside of the tread portion 1. On the inner peripheral surface 5a of the noise absorbing member 5, protective layers 7 and 7 are provided on both of the end portions thereof in the tire width direction, and the protective layers 7 are composed of a hard resin sheet or a metal sheet, which is higher in hardness than the noise absorbing member 5.

Figure 4:
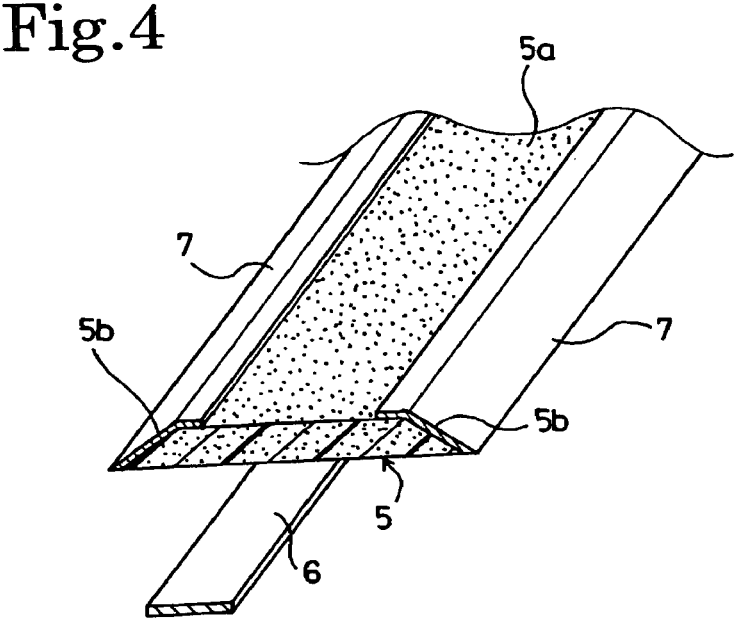
FIG. 4 is a perspective view showing a noise absorbing member according to another embodiment, in a state of partially being cutaway.
Figure 5:
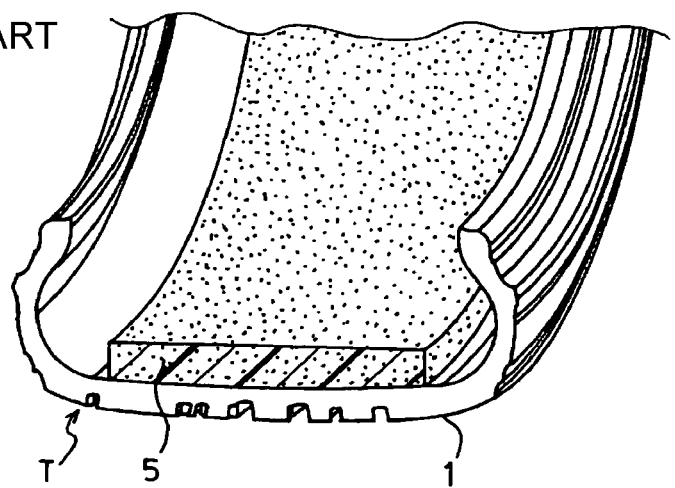
FIG. 5 is a perspective view showing a conventional low noise pneumatic tire, in a state of partially being cutaway.

The above-described protective layers 7 may be provided on the noise absorbing member 5 as in an embodiment shown in FIG. 4. Specifically, both side surfaces of the noise absorbing member 5 may be individually formed into inclined surfaces 5b and 5b, and both of the inclined surfaces 5b and 5b and both of the end portions of the inner peripheral surface 5a in the tire width direction may be coated with the protective layers 7 and 7.

As described above, at least both of the end portions of the inner peripheral surface 5a of the noise absorbing member 5 are coated with the protective layers 7 and 7. In such a way, when the pneumatic tire T mounted on the rim is removed from the rim R by using the tire changer, the tip end of the lever X is brought into direct contact with the surface of the protective layer 7, thus making it possible to prevent the noise absorbing member 5 from being damaged. Hence, as in the embodiment of FIG. 1, durability of the noise absorbing member 5 is enhanced and good noise absorbing performance is maintained for a long period of time.

In the present invention, a hard material for the protective layers 7 is not particularly limited, but includes the hard material higher in hardness than the noise absorbing member 5; however, should preferably be composed of resin sheets or metal sheets. As a material for the resin sheets, there are polypropylene, polyethylene, polyester, polyamide, and the like. As a material for the metal sheets, there are steel, copper, and the like, and stainless steel is particularly preferable.

Preferably, a thickness of the protective layers is set at 0.05 to 1.0 mm. When the thickness of the protective layers is smaller than 0.05 mm, it is difficult to prevent the noise absorbing member from being damaged by the contact thereof with the tip end of the lever. Meanwhile, when the thickness of the protective layers is larger than 1.0 mm, bending rigidity of the noise absorbing member is increased, and accordingly, it is difficult to attach the noise absorbing member along the inner peripheral surface of the tire.

Preferably, a width of the protective layers in the tire width direction is set at 10 to 40 mm. When the width of the protective layers is smaller than 10 mm, it is difficult to prevent the noise absorbing member from being damaged by the contact thereof with the tip end of the lever. Moreover, when the width of the protective layers is larger than 40 mm, a coated area of the protective layers to the inner peripheral surface of the noise absorbing member is too large, resulting in a decrease of the noise absorbing performance.

Moreover, in the embodiment of FIG. 2, more preferably, the tire cavity sides of the protective layers 7 are applied with the lubricant used in the embodiment of FIG. 1. The lubricant is used as described above, in order for the lever of the tire changer to slip on the protective layers 7. Accordingly, such an effect of preventing the damage of the noise absorbing member by the protective layers can be further enhanced.

Note that, in the embodiments of FIG. 1 and FIG. 2, the noise absorbing member 5 is attached to the inner peripheral surface 1a of the tire by disposing the elastic fixing band 6 on the outer periphery side of the noise absorbing member 5; however, the elastic fixing band 6 may be disposed and attached to the inner peripheral surface 5a side of the noise absorbing member 5.

The above-described low noise pneumatic tire of the present invention can be applied to a general pneumatic tire. However, the low noise pneumatic tire concerned can exert a large effect particularly in the case of being applied to a pneumatic tire with the aspect ratio of 45% or less, which is likely to cause the damage of the noise absorbing member.

Example

As a common condition, the following was set, where a noise absorbing member, made of a urethane foam, with a thickness of 20 mm and a width of 180 mm was attached to an inner peripheral surface of a low noise pneumatic tire with a size of 225/40R18 by an elastic fixing band, made of polypropylene resin, with a width of 20 mm and a thickness of 2 mm. Then, the following low noise pneumatic tires were individually built, which are: a low noise pneumatic tire in which polyethylene wax was applied to an inner peripheral surface of the noise absorbing member (Example 1); a low noise pneumatic tire in which polypropylene resin sheets (protective layers) with a width of 20 mm and a thickness of 0.5 mm were covered on both end portions in the tire width direction of the inner peripheral surface of the noise absorbing member (Example 2); a low noise pneumatic tire in which the polyethylene wax was applied to surfaces of the protective layers in the tire configuration of Example 2 (Example 3); and a low noise pneumatic tire in which the surface of the noise absorbing member was not subjected to any process (Conventional example).

For each of these four types of pneumatic tires, fifty times repeated was work of removing these pneumatic tires from a rim by using the same tire changer after mounting the pneumatic tires concerned to the rim. Then, the number of times that damage occurred on the surface of each noise absorbing member was investigated. Results of the investigations are shown in Table 1.

TABLE 1

|  | Example 1 | Example 2 | Example 3 | Conventional example |
|---|---|---|---|---|
| Occurrence of the number of times that noise absorbing member is damaged | 4 | 1 | 0 | 17 |

As is clear from the results shown in Table 1, in Examples 1 and 2, the occurrences of the damage on the noise absorbing member are drastically reduced compared to the conventional example.

What is claimed is:

1. A low noise pneumatic tire, mounted on a rim, comprising:
    an inner peripheral surface of the tire forming a cavity in combination with the rim, and comprising:
    a noise absorbing member of a porous material which is attached to the inner peripheral surface of the tire,
    wherein one end portion in the tire width direction on the inner peripheral surface of the noise absorbing member is covered with a first protective layer harder than the noise absorbing member, and wherein the other end portion in the tire width direction on the inner peripheral surface of the noise absorbing member is covered with a second protective layer harder than the noise absorbing member and completely separate from the first protective layer.

2. The low noise pneumatic tire according to claim 1, wherein
    both side surfaces in the tire width direction of the noise absorbing member are formed into inclined surfaces, and
    the inclined surfaces are covered with the protective layers together with both of the end portions in the tire width direction.

3. The low noise pneumatic tire according to claim 2, wherein a lubricant is applied to surfaces of the protective layers.

4. The low noise pneumatic tire according to claim 2, wherein the width of each of the protective layers is between 10 to 40 mm.

5. The low noise pneumatic tire according to claim 2, wherein the thickness of each of the protective layers is between 0.05 to 1.0 mm.

6. The low noise pneumatic tire according to claim 2, wherein the aspect ratio of the pneumatic tire is 45% or less.

7. The low noise pneumatic tire according to claim 1, wherein each of the protective layers is formed of a resin sheet.

8. The low noise pneumatic tire according to claim 7, wherein a lubricant is applied to surfaces of the protective layers.

9. The low noise pneumatic tire according to claim 7, wherein the width of each of the protective layers is between 10 to 40 mm.

10. The low noise pneumatic tire according to any claim 7, wherein the thickness of each of the protective layers is between 0.05 to 1.0 mm.

11. The low noise pneumatic tire according claim 1, wherein a lubricant is applied to surfaces of the protective layers.

12. The low noise pneumatic tire according to claim 1, wherein the width of each of the protective layers is between 10 to 40 mm.

13. The low noise pneumatic tire according to claim 1, wherein the thickness of each of the protective layers is between 0.05 to 1.0 mm.

14. The low noise pneumatic tire according to claim 1, wherein the aspect ratio of the pneumatic tire is 45% or less.

* * * * *